US011680880B2

(12) United States Patent
Ader et al.

(10) Patent No.: US 11,680,880 B2
(45) Date of Patent: Jun. 20, 2023

(54) TENSILE TESTING MACHINE

(71) Applicant: Safran Helicopter Engines, Bordes (FR)

(72) Inventors: Gilles Ader, Moissy-Cramayel (FR); Christophe Siret, Moissy-Cramayel (FR); Pierre Lamarque, Moissy-Cramayel (FR)

(73) Assignee: Safran Helicopter Engines, Bordes (FR)

( * ) Notice: Subject to any disclaimer, the term of this patent is extended or adjusted under 35 U.S.C. 154(b) by 439 days.

(21) Appl. No.: 17/058,512

(22) PCT Filed: May 29, 2019

(86) PCT No.: PCT/FR2019/051271
§ 371 (c)(1),
(2) Date: Nov. 24, 2020

(87) PCT Pub. No.: WO2019/229386
PCT Pub. Date: Dec. 5, 2019

(65) Prior Publication Data
US 2021/0199549 A1    Jul. 1, 2021

(30) Foreign Application Priority Data

May 30, 2018   (FR) ...................................... 1854612

(51) Int. Cl.
*G01N 3/14*   (2006.01)
*G01N 3/06*   (2006.01)
*G01N 3/08*   (2006.01)

(52) U.S. Cl.
CPC ............... *G01N 3/14* (2013.01); *G01N 3/066* (2013.01); *G01N 3/08* (2013.01); *G01N 2203/0017* (2013.01); *G01N 2203/0033* (2013.01); *G01N 2203/0071* (2013.01); *G01N 2203/04* (2013.01); *G01N 2203/0635* (2013.01)

(58) Field of Classification Search
CPC ............ G01N 3/14; G01N 3/066; G01N 3/08; G01N 2203/0017; G01N 2203/0033; G01N 2203/0071; G01N 2203/04; G01N 2203/0635
See application file for complete search history.

(56) References Cited

U.S. PATENT DOCUMENTS 3,600,939 A * 8/1971 Steele ....................... G01N 3/08
                                                        73/833
3,974,686 A * 8/1976 Van Mastrigt ........... G01N 3/06
                                                        73/834

FOREIGN PATENT DOCUMENTS

| FR | 2 577 674 A1 | 8/1986 |
|---|---|---|
| FR | 2 918 173 A1 | 1/2009 |
| FR | 2 918 174 A1 | 1/2009 |

* cited by examiner

*Primary Examiner* — Jonathan M Dunlap
(74) *Attorney, Agent, or Firm* — Blank Rome LLP

(57) ABSTRACT

A tensile testing machine comprising a test specimen whose elongation is to be measured along a tensile axis, slide plates, an intermediate plate, and first and second parallel guide rods, which freely guide the slide plates axially past them.

8 Claims, 3 Drawing Sheets

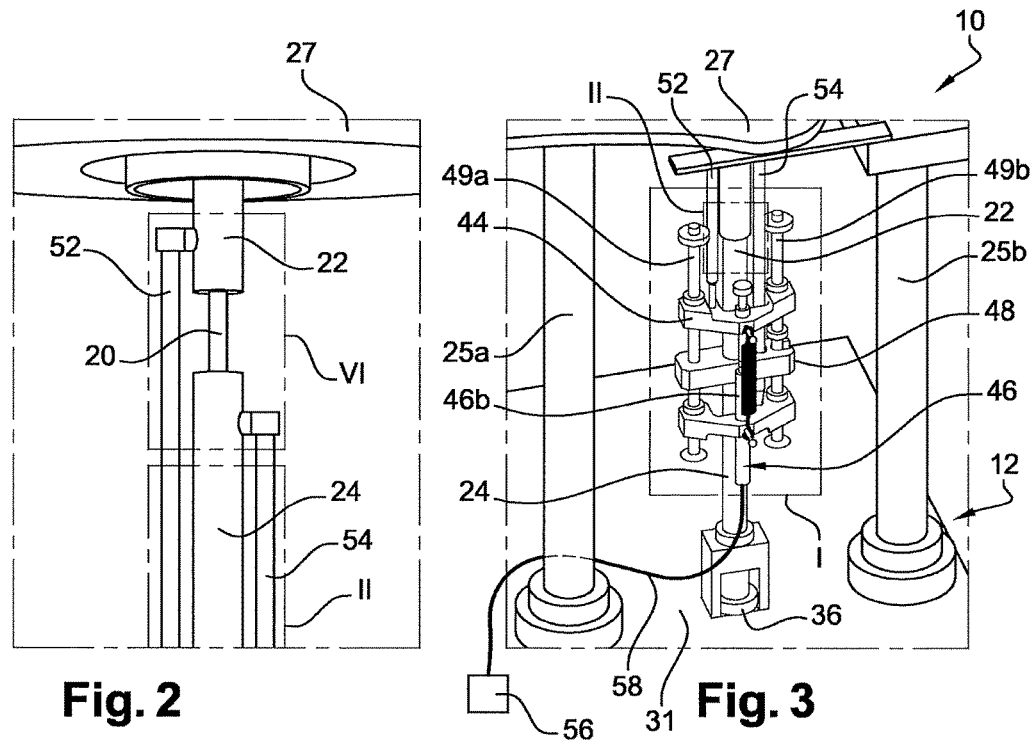
Fig. 2  Fig. 3
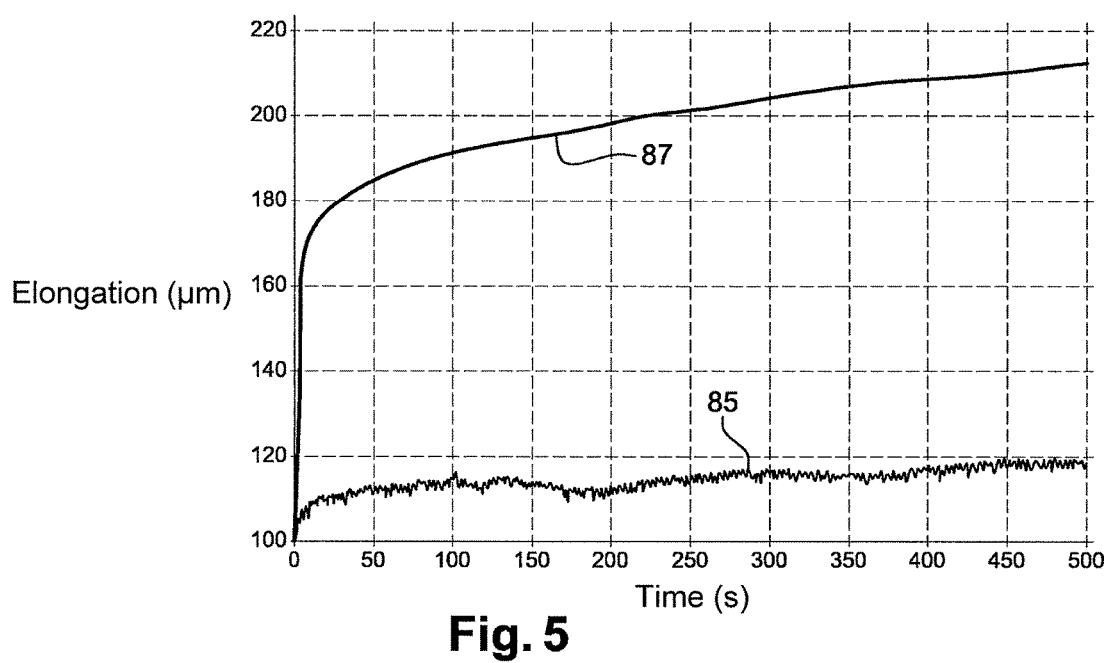
Fig. 5

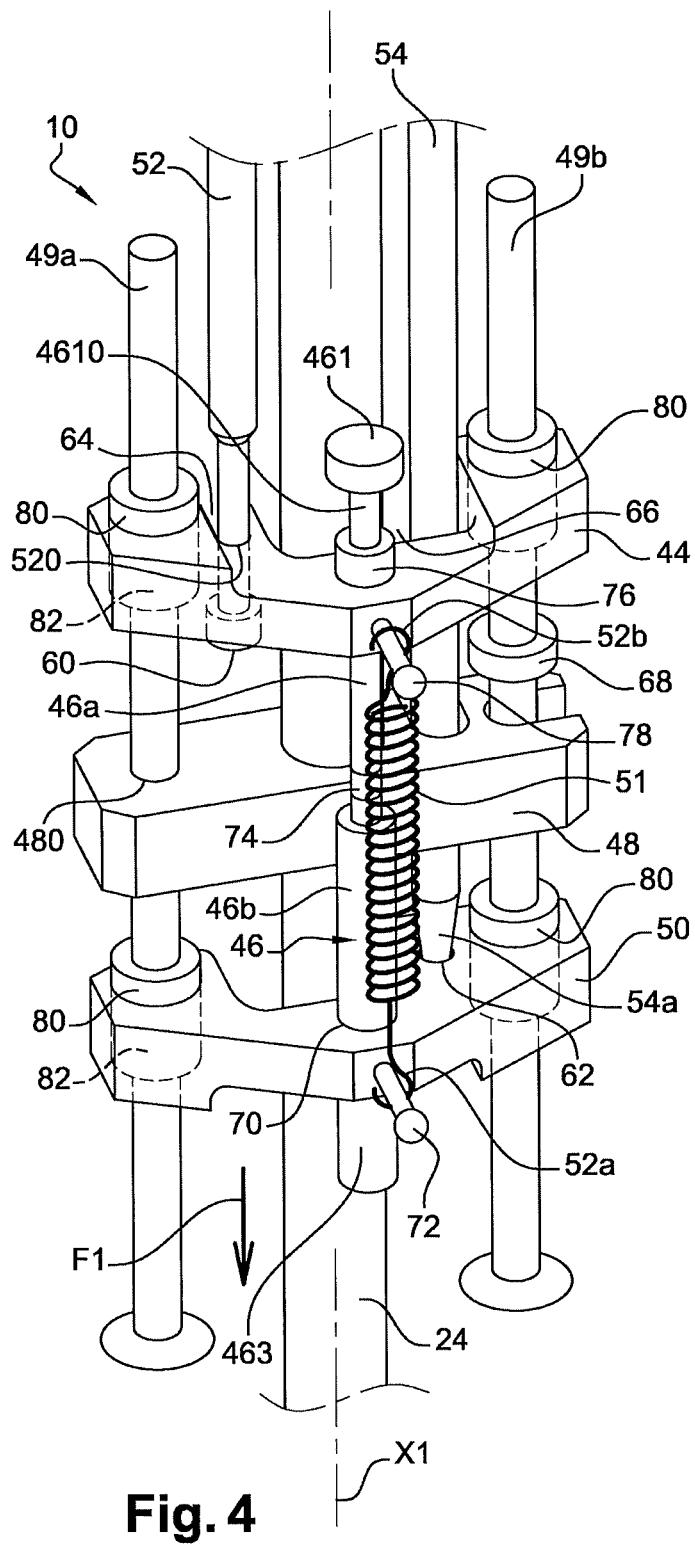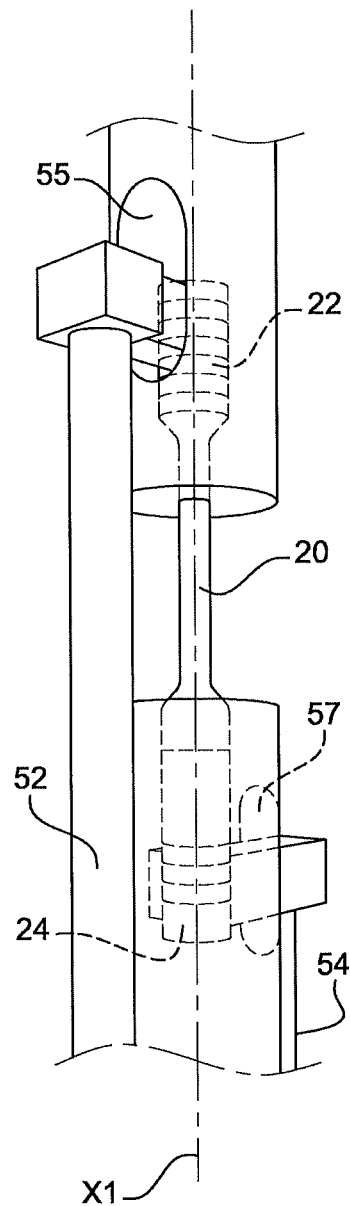
Fig. 4
Fig. 6

TENSILE TESTING MACHINE

CROSS REFERENCE TO RELATED APPLICATIONS

This application is a national phase of PCT/FR2019/051271, filed May 29, 2019, which claims the benefit of French patent application no. 1854612, filed on May 30, 2018, the subject matter of all of which are incorporated by reference herein in their entirety.

BACKGROUND/SUMMARY OF THE INVENTION

The present invention relates to a tensile testing machine, and more particularly to the means making it possible, structurally, to secure the achievement of a high level of precision on the exploitable deformation curves resulting from the tests on specimens carried out on this machine.

Such machines already exist, including:
- a frame provided with a first fastening element at a first end of a test specimen whose elongation is to be measured along a tensile axis (X1), and
- tensile means adapted to exert a traction along the tensile axis (X1) and provided with a second (fastening) element forming an axial bar or rod at a second end of the specimen, coaxially to the tensile axis (X1).

Document FR2918173 discloses an example of this, namely a creep or tensile fatigue testing machine where a test specimen is subjected to a single cycle (or a reduced number of cycles) to test the endurance of a material subjected to varying stresses. The machine, of relatively simple and economical design, includes:
- a frame provided with an upper fastening element at said first (here upper) end of the test specimen, along the tensile axis (X1), and
- a lever pivotally mounted on the frame about an axis transverse to said tensile axis (X1) and provided with means for connection with the specimen, comprising said second (here lower) attachment element at the second (here also lower) end of the specimen, coaxially to the tensile axis (X1).

One end of the lever carries a mass to apply an axial tensile force to the lower end of the specimen.

For example, the dimensioning and lifetime calculations of aeronautical turbine components are based, on the one hand, on material data from conventional mechanical tests and, on the other hand, on turbine tests on engine test benches and on return on experience. The creep behaviour of parts such as high-pressure turbine blades, for example, is a key point for optimal turbine sizing and benefits from comprehensive and thorough characterizations. In mechanical tests on specimens, especially in creep tests, it is essential to have high quality deformation curves that can be used from the very first moment the specimens are loaded. Today, the structural realizations of tensile testing machines using such specimens for creep testing do not systematically provide a level of precision adapted to the needs. Singular points such as backlash, "mechanical noise", etc., can be observed during loading or during the creep test.

More generally, on the machines concerned, there is currently a problem of guidance, or relative positioning accuracy between:
- a first part of elongation measuring means for measurements of said elongation parallel to the tensile axis (X1), and
- a second part of these means for measuring elongation, functionally associated or even physically linked to said first part.

For example, strain measurements can be performed using inductive LVDT (Linear Variable Differential Transformer) or capacitive sensors or using optical or interferometric devices, etc.

In particular, the invention is intended to provide a simple, economical and effective solution to these problems, making it possible to avoid the disadvantages of the known technique and to improve a tensile testing machine, of simple and economical design, in order to make it suitable for carrying out more precise, or even more complex creep tests and tensile fatigue tests possibly involving a large number of cycles. In particular, the invention is intended to make it possible to achieve a high level of precision in the measurements carried out.

For this purpose, it offers a specimen tensile testing machine, characterised in that it further comprises:
- a first sliding plate slidably mounted along the second fastening element and on which a first part of elongation measuring means for measurements of said elongation parallel to the tensile axis (X1) is mounted,
- a second intermediate plate, which is fixed to the second fastening element and to which a first guide rod is fixed, which extends parallel to the tensile axis (X1) and passes freely through the first sliding plate,
- a third sliding plate which is slidably mounted along the second fastening element and to which a second part of the elongation measuring means is attached,
- an elastic return means returning the first and third sliding plates towards each other axially,
- a second guide rod parallel to the first guide rod, which freely guides the first and third sliding plates axially, by being disposed at their level,
- first and second deflection rods, sensing the first and second fastening elements, respectively, the first deflection rod being fixed with the first sliding plate through which the second deflection rod passes, which further comes to bear against the third sliding plate, to act on it parallel to the tensile axis, so that the elongation measuring means detect, parallel to said axis (X1), a displacement between the first and third sliding plates.

This displacement is equal to the axial elongation of the specimen under the effect of the tensile means.

Guiding the return rods, avoiding hyperstaticity was also a concern.

Therefore it is proposed:
- that the first deflection rod passes through the first sliding plate at a passage which is open transversely to the tensile axis (X1), and
- that the second deflection rod passes through the first sliding plate at the location of an additional passage which is open transversely to the tensile axis (X1) and through which the second fastening element also passes.

In connection with an identical approach to the second guide rod, whose function as a guide for the first and third sliding plates must then be different from that of the first guide rod, it is proposed that the second guide rod passes freely through the intermediate plate and that the free sliding movement of the first and third sliding plates parallel to the tensile axis (X1) is limited by a stop:
- attached to the second guide rod, and
- interposed between the first sliding plate and the intermediate plate.

In an application to a testing machine of the type according to FR2918173, there may be an interest, for efficiency purposes, in a simple and economical design, to make it suitable for performing very accurate, or even complex creep tests, such that:

the first and second fastening elements are upper and lower fastening elements for the upper and lower ends respectively of the test specimen, the first and third sliding plates are upper and lower plates respectively, and the tensile means comprise a lever pivotally mounted on the frame about an axis transverse to said tensile axis (X1) and connected to said second fastening element, coaxially to the tensile axis, one end of the lever carrying a mass for applying an axial tensile force to said second end of the specimen.

Using certain sensors rather than other is advantageous in terms of measurement quality but may be a constraint in terms of structural realisation, taking into account the requirements expressed above.

Consequently, the following is proposed:

that one of said first and second parts of the measuring means comprises reference means for said measurements acting parallel to the tensile axis (X1), and that the other of said first and second parts of the measuring means comprises, coaxially linked thereto, an LVDT sensor.

Such a sensor, under these conditions, allows the precise measurement of the relative displacement between the first upper plate and the third lower plate and therefore the total elongation of the test specimen (via the deflection rods).

In this respect, it is furthermore preferably proposed that such an LVDT sensor should preferably pass through and then be attached to the lower sliding plate through a slotted centring bushing which will be locked by a first screw to which a second end of the spring return means will be attached.

For still the same desired levels of accuracy, it is proposed that the reference means for said measurements comprise an adjusting screw which passes through and is connected to said first sliding plate by means of a threaded ring:

on which the adjusting screw is screwed, which extends in and out of said first sliding plate, and that a second screw to which a first upper end of the elastic return means is attached is blocked.

In this way, it will be possible to lengthen certain guide distances and to lock the adjustment screw in position in order to reduce the mechanical play, always with the aim of improving the accuracy of the measurements taken.

In the same approach, it is proposed that the testing machine further comprises ball guides mounted in the passages of the first and third sliding plates through which the first and second guide rod pass, respectively, the ball guides passing (entirely) through said passages until they extend beyond them.

The invention will be better understood and other details, characteristics and advantages of the invention will appear when reading the following description, which is given as a non-limiting example, with reference to the attached drawings.

BRIEF DESCRIPTION OF THE FIGURES

FIG. 2 shows in particular area II of FIG. 3;

FIG. 3 shows in particular area I of FIG. 1;

FIG. 4 shows even better area I in FIGS. 1 and 3;

FIG. 5 shows two curves of evolution over time (abscissa) of an elongation of a specimen (ordinate) mounted either on a machine of the prior art (curve 85) or on the machine according to the invention (curve 87); and FIG. 6 shows in particular area VI in FIG. 2, rotated a quarter turn.

DETAILED DESCRIPTION

Figure 1:
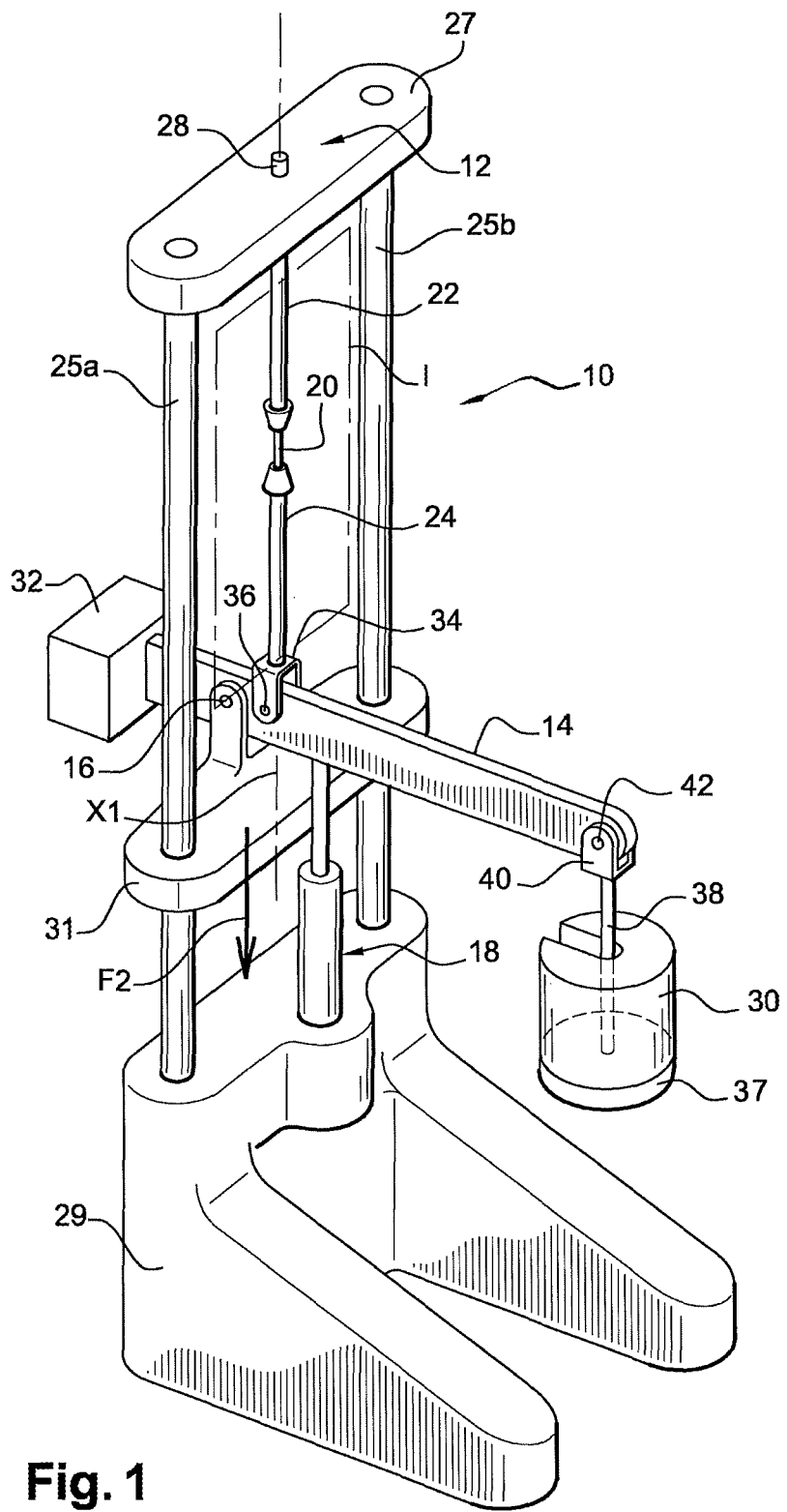
FIG. 1 is a schematic perspective view of a tensile testing machine according to the invention, even if it does not show in particular zone I where the essential guiding means securing the measurements by the sensor are located.

For the sake of brevity, an example of a testing machine of the type of FR2918173 is described below. However, tensile means other than a lever 14 pivotally mounted on frame 12 and one end of which carries a mass 30 to apply an axial tensile force to test specimen 20 could be provided.

For example, FIG. 1 shows a creep testing machine 10 comprising:

a frame 12 carrying a lever 14 mounted so as to pivot about an axis 16 transverse to the tensile axis X1 and supported by a jack 18, and a test specimen 20, e.g. in the form of a cylindrical rod, which is attached at its upper and lower ends respectively to a rod 22, known as the upper rod, for suspension from the frame 12 and to a rod 24, known as the lower rod, for attachment or fastening to the lever 14. The frame includes a first fixed upright 25a and a second fixed upright 25b parallel to the first fixed upright. The two fixed uprights 25a, 25b are parallel to the tensile axis X1, extend between an upper cross plate 27 and a lower base 29 of frame 12, having in passing through a lower cross plate 31.

It will have been understood that "axial" implies parallel to (combined with) the tensile axis X1 and that "transverse" is to be considered in relation to this axis X1. Lever 14 is swiveled to the lower cross plate 31.

Specimen 20 and the two rods 22 and 24 form a load line along the tensile axis X1, which here is substantially vertical. Thus, along the tensile axis X1:

the upper rod, or first rod 22 defines a first attachment element (or upper member) at a first end (or upper end) of the test specimen 20, an elongation of which is to be measured, and the lower rod, or second rod 24 defines a second (or lower) attachment element at a second (or lower) end of the same test specimen 20.

The upper end of the upper rod 22 is connected to the upper cross plate 27 by a ball joint 28.

To define tensile means configured to exert a traction along the tensile axis (X1) and provided with the second fastening element 24, coaxially to the tensile axis (X1), lever 14 carries a mass 30. In the example shown, the transverse axis of rotation 16 of the lever on the lower cross plate 31 is at a distance from one end of the lever carrying the mass 30 of about three-quarters of the length of the lever. The other end of the lever carries a balancing weight 32. The lower end of the lower rod 24 is connected to the lever 14 by a clevis 34 mounted rotatably about a transverse axis 36 of the lever, arranged between the mass 30 and the axis of rotation 16 of the lever and in the vicinity of this axis of rotation 16, so as to benefit from a large lever arm, for example equal to about ten. The balancing counterweight 32 is intended to balance lever 14 in the absence of the weight 30. Thus, at rest, it is possible that no tension is exerted on test specimen 20. The mass 30 rests on a circular plate 37 which is suspended from lever 14 by a rod 38 connected to a clevis 40 mounted around a transverse axis 42 of lever 14. The creep testing machine can be operated in the following way: when stationary, ram 18 is extended as shown in FIG. 1 and supports lever 14 by compensating the force from mass 30. In operation, cylinder 18 is retracted so that clevis 34 is subjected to an axial downward tensile force (i.e. axis X1), the magnitude of which depends on both the mass 30 and the lever arm. This tensile force is transmitted by rod 24 to the specimen, which then tends to elongate under axial tension.

In particular on such a machine, the invention makes it possible to secure the axial guidance and thus to improve the quality of the measurements referred to below.

Thus it is intended, as shown in FIGS. 3-4:
- a first sliding plate 44 mounted slidably along the second fastening element 24 and on which a first part 46a of elongation measuring means 46 configured to control (measure and transmit) the elongation of the test specimen 20 parallel to the tensile axis (X1),
- a second intermediate plate 48, which is attached to the second fastening element 24 and to which a first guide rod 49a is attached (480 in FIG. 4),
- a third sliding plate 50, which is slidably mounted along the second fastening element 24 and to which a second part 46b of the elongation measuring means 46 is attached,
- an elastic return means 51 returning the first and third sliding plates 44, 50 towards each other axially,
- and first and second deflection rods 52, 54, respectively, which feel the first and second fastening elements 22, 24, respectively.

In 520 (FIG. 4), the first deflection rod 52 is fixed with the first sliding plate 44 through which the second deflection rod 54 passes, which furthermore comes to rest against the third sliding plate 50, to act on it parallel to the tensile axis (X1), here pushing it downwards (arrow F1 in FIG. 4) when the downward tensile force is exerted (arrow F2 in FIG. 1). The elongation measuring means 46 will then detect, parallel to said axis (X1), a displacement between the first and third sliding plates 44, 50. They will transmit the measurements to a computing unit 56 via a wiring 58.

Towards the zone where test specimen 20 is located, the first and second return rods 52, 54, respectively, come into contact with the centre hole of the upper head of the test piece and the centre hole of the lower head of the test piece, for transmission or return of data, namely those related to the measurements of elongation rate in time to be obtained; see FIG. 5. Through an oblong hole 55, elongated parallel to the axis X1 (FIG. 6), the first deflection pin 52 is in contact with the centre hole of the upper head of the test specimen 20, the latter being screwed into the fastening element 22. Same on the diametrically opposite side where, through an oblong hole 57, elongated parallel to the axis X1 (FIG. 6), the second deflection rod 54 is in contact with the centre hole of the lower head of the test specimen 20, the latter being screwed into the fastening element 24. Then, the deflection rods 52, 54 extend axially to plates 44, 48, 50 until the first deflection rod 52 is fixed to plate 44 and the second deflection rod 54 presses against plate 50.

In the creep test (specimen 20 subjected to a predefined tensile force and temperature according to F1 via elements 22 and 24), the specimen is elongated. The guide rods and thus the first and third sliding plates 44, 50 are axially spread apart. The sensor 46b/463 measures the displacement of one plate in relation to the other.

Preferably extending on one side of said second fastening element 24, the first guide rod 49a passes freely (without contact, without friction) through the first sliding plate 44.

Preferably extending on the opposite side to the guides and forces, a second guide rod 49b freely guides the first and third sliding plates 44, 50 axially through both of them. The first guide rod 52 should preferably be fixed to the first sliding plate 44 underneath the plate 44 via a cylindrical allowance 60. The support of the second deflection rod 54 against the third sliding plate 50 is preferably effected by a tapered end 54a of the deflection rod 54 axially engaged in a hole 62 of the sliding plate 50.

Thus, the first and second guide rods 49a, 49b act axially together on the first and third sliding plates 44, 50 with an intermediate fastening of the first guide rod 49a alone to the intermediate plate 48: The second guide rod 49 which, like the first one, freely guides (axially) the first and third sliding plates 44, 50 is not in contact with the intermediate plate 48.

In addition, in the preferred embodiment illustrated:
- the first deflection rod 52 passes through the first sliding plate 44 at a passage 64 which is open transversely to the tensile axis (X1), and
- the second deflection rod 54 passes through the first sliding plate 44 at the location of an additional passage 66 which is open transversely to the tensile axis (X1) and through which the second fastening element 24 also passes.

The first deflection rod 52 can thus be easily intervened in or operated and, with the passage 66 in the form of a wide central opening, the first sliding plate 44 can, like the third sliding plate 50, be U-shaped so as to avoid contact with the second deflection rod 54 (for plate 44) and the second fastening element 24, which thus passes axially and freely along the two sliding plates 44, 50.

Also, for this problem of quality of the measurement readings, it is recommended that the second guide rod 49b passes freely through the intermediate plate 48 and that the free sliding of the first and third sliding plates 44, 50 parallel to the tensile axis (X1) is limited by a stop 68 fixed on the second guide rod 49b and interposed between the first sliding plate 44 and the intermediate plate 50 (when the axial elongation of the specimen 20 induces a movement according to the arrow F1).

In order to couple the above with particularly effective measures, it is also advisable:
- that one of said first and second parts 46a, 46b of the measuring means 46 comprises reference means 461 for said measurements acting parallel to the tensile axis (X1), and
- that the other 46b of said first and second parts of the measuring means comprises, coaxially linked thereto, an axial LVDT sensor 463.

In this case, it should be preferred that this LVDT sensor 463 passes through the third, then lower, sliding plate 50 and is attached to it by means of a slotted centring bushing 70 which is secured by a first screw 72 to which a second (lower) end 52a of the axial spring return means 51 is attached.

The LVDT sensor 463 will then detect-measure-axial distance changes in relation to a reference situation defined by the axial position of the reference means 461, which will have been predetermined on the first sliding plate 44 at the start of the test. The LVDT sensor 463 and the reference means 461 are connected together so that when an alternating current flows through the primary winding of the LVDT sensor 463, the movement of the sensor's ferromagnetic core changes the coupling between the primary and secondary windings of the sensor. FIG. 4, the physical connection between the LVDT sensor 463 (sphere at its end) and the set screw referenced 461 (flat surface perpendicular to axis X1) is a point contact referenced 74.

To promote the expected level of measurement quality, the reference means 461 for these measurements will advantageously include, in their cooperation with the LVDT sensor, a set screw 4610 passing through the first sliding plate 44 and connected to it by means of a threaded ring 76. The adjusting screw 4610 is screwed onto ring 76 and locked by a second screw 78 to which a first end 52b, here upper, of the elastic return means 51 is fixed.

The adjusting screw 4610 allows to refine said position in a reference situation; and if, as recommended, the threaded ring 76 is long and extends into plate 44, but also extends outwards, along the body of the screw, then it guides the screw in the best way.

Also, for an improved axial guidance which does not hinder the necessary axial movement of the sliding plates, it is proposed that the test machine should additionally include ball guides 80 mounted in passages 82 (of which only two have been shown in FIG. 4) of the first and third sliding plates 44, 50. The first and second guide rods 49a, 49b, respectively, pass through them in pairs.

The ball guides 58 pass through passages 60 until they extend beyond them (above and/or below).

FIG. 5 shows two curves 85, 87. Curve 85 comes from a machine that does not benefit from a double guide as above, with the two guide rods 49a, 49b. Curve 87 benefits from this and was obtained with a machine according to the invention, which therefore makes it possible to systematically obtain loading curves and creep curves free of singular points which were due, as on curve 85, to jumps (resumption of play, "mechanical noise", fluctuations . . . ) encountered with the existing initial solution. Curve 87 is smooth and continuous.

If the means 46 were optical means, an optical sensor in place of the LVDT sensor 463 and a variable-pitch mirror in place of the measurement reference means 461 could be provided.

The invention claimed is:

1. A tensile testing machine comprising:
   a frame provided with a first fastening element at a first end of a test specimen whose elongation is to be measured along a tensile axis; and
   tensile means adapted to exert a traction along the tensile axis and provided with a second fastening element, forming an axial bar, at a second end of the specimen, coaxially to the tensile axis,
   wherein the tensile testing machine further comprises:
   a first sliding plate slidably mounted along the second fastening element and on which a first part of elongation measuring means for measurements of said elongation parallel to the tensile axis is mounted,
   a second intermediate plate, which is fixed to the second fastening element and to which a first guide rod is fixed, the first guide rod extending parallel to the tensile axis and passing freely through the first sliding plate,
   a third sliding plate, which is slidably mounted along the second fastening element and to which a second part of the elongation measuring means is attached,
   an elastic return means returning the first and third sliding plates towards each other axially,
   a second guide rod parallel to the first guide rod, which freely guides the first and third sliding plates axially, by being disposed at their level, and
   first and second deflection rods, sensing the first and second fastening elements, respectively, the first deflection rod being fixed with the first sliding plate through which the second deflection rod passes, the second deflection rod further coming to bear against the third sliding plate, to act on the third sliding plate parallel to the tensile axis, so that the elongation measuring means detect, parallel to said tensile axis, a displacement between the first and third sliding plates.

2. The testing machine according to claim 1, wherein:
   the first deflection rod passes through the first sliding plate at a passage which is open transversely to the tensile axis, and
   the second deflection rod passes through the first sliding plate at the location of an additional passage which is open transversely to the tensile axis and through which the second fastening element also passes.

3. The testing machine according to claim 1, in which the second guide rod passes freely through the intermediate plate and the free sliding of the first and third sliding plates parallel to the tensile axis is limited by a stop fixed to the second guide rod and interposed between the first sliding plate and the intermediate plate.

4. The testing machine according to claim 1, wherein:
   the first and second fastening elements are upper and lower fastening elements for the upper and lower ends respectively of the test specimen,
   the first and third sliding plates are upper and lower plates respectively, and
   the tensile means comprise a lever pivotally mounted on the frame about an axis transverse to said tensile axis and connected to said second fastening element, coaxially to the tensile axis, one end of the lever carrying a mass for applying an axial tensile force to said second end of the specimen.

5. The testing machine according to claim 1, wherein:
   one of said first and second parts of the measuring means comprises reference means for said measurements acting parallel to the tensile axis, and
   that the other of said first and second parts of the measuring means comprises, coaxially linked thereto, an LVDT sensor.

6. The testing machine according to claim 5, in which the LVDT sensor passes through and is attached to the third sliding plate via a slotted centring bushing which is locked by a first screw to which a second lower end of the elastic return means is attached.

7. The testing machine according to claim 5, in which the reference means for said measurements comprise an adjusting screw which passes through and is connected to said first sliding plate by means of a threaded ring onto which the adjusting screw is screwed and which is locked by a second screw to which a first upper end of the elastic return means is fixed.

8. The testing machine according to claim 1, which further comprises ball guides mounted in passages of first and third sliding plates through which first and second guide rods, respectively, pass, the ball guides passing through said passages to extend beyond them.

* * * * *